United States Patent [19]
Shu

[11] Patent Number: 6,115,193
[45] Date of Patent: Sep. 5, 2000

[54] PANORAMIC SENSOR HEAD

[75] Inventor: Ker-Li Shu, Danbury, Conn.

[73] Assignee: Raytheon Company, Lexington, Mass.

[21] Appl. No.: 09/138,436

[22] Filed: Aug. 21, 1998

[51] Int. Cl.[7] ............................ G02B 13/06; G02B 17/00
[52] U.S. Cl. ........................ 359/725; 359/726; 359/728; 359/732
[58] Field of Search .................................. 359/725, 726, 359/728, 732

[56] References Cited

U.S. PATENT DOCUMENTS

| 3,505,465 | 4/1970 | Rees | 359/725 |
| 5,473,474 | 12/1995 | Powell | 359/729 |

*Primary Examiner*—Georgia Epps
*Assistant Examiner*—Evelyn A. Lester
*Attorney, Agent, or Firm*—William C. Schubert; Glenn H. Lenzen, Jr.

[57] ABSTRACT

A device for creating a panoramic field of view comprises a first light passing incident surface which is a cylinder surface and a second incident surface which is a mirror surface onto which light passing through the first surface impinges. A third incident surface onto which light from the second incident surface impinges is provided and the third incident surface being an aspherical transmission surface. A recollimating element for presenting a pupil plane depiction of a panoramic field of view is also provided. Various embodiments may include single or double lens devices with a second lens provided for the purpose of recollimating light.

11 Claims, 3 Drawing Sheets

PANORAMIC SENSOR HEAD

FIELD OF THE INVENTION

The present invention relates to laser detection and warning systems and, more particularly, to panoramic field detection. There are also potential applications for the invention in sensors for automotive or traffic control where needs cover a panoramic field of view, or can be used in a reverse mode as a light transmitter to transmit or scan light over a panoramic field of view.

BACKGROUND OF THE INVENTION

In the past, panoramic viewing was accomplished using a plurality of sensors with each sensor disposed at a given angle so that the total sensing fields of the sensors together completed a three hundred sixty degree view. Such a sensor array was problematic in that each of the plurality of sensors used needed to be individually connected to a controller responsible for piecing together the individual fragments of the overall panoramic view attempted to be scanned. This involved numerous electrical connections and considerable cost in manual labor.

Thus it is an object of the invention to accomplish what has otherwise been done through using numerous sensors in an array using a single optical three hundred sixty degree optical lens type sensor. by way of background it should be understood that the primary function of a telescope is to enlarge the apparent size of a distant object. This is accomplished by presenting to the eye an image which subtends a larger angle (from the eye) than does the object. The magnification, or power, of a telescope is simply the ratio of the angle subtended by the image to the angle subtended by the object. Nominally, a telescope works with both its object and image located at infinity; it is referred to as an a focal instrument, since it has no focal length. In practice, departures from these infinite conjugates are the rule, but for the most part they may be neglected. However, one should be aware that when the object and or the image are not at infinity, this will occasionally have a noticeable effect and must then be taken into account. This is usually important only with low-power devices.

There are three major types of telescopes: astronomical (or inverting), terrestrial (or erection), and Galilean. An astronomical or Keplerian telescope is composed of two positive (i.e., converging) components spaced so that the second focal point of the first component coincides with the first focal point; the eyelens then reimages the object at infinity where it may be comfortably viewed by a relaxed eye. Since the internal image is inverted, and the eyelens does not reinvert the image, the view presented to the eye is inverted top to bottom and reversed left to right.

In a Galilean telescope, the positive eyelens is replaced by a negative (diverging) eyelens where the focal points of objective and virtual focus of the negative eyelens coincide. In the Galilean scope, however, the internal image is never actually formed; the object for the eyelens is a "virtual" object, no inversion occurs, and the final image presented to the eye is erect and unreversed. Since there is no real image formed in a Galilean telescope, there is no location where cross hairs or a reticle may be inserted.

The present invention in its preferred embodiment uses reverse Galilean, telescope type arrangements, front negative element and rear positive element, to effect sensing as will become apparent from the following disclosure.

Accordingly, it is an object of the invention to provide a sensing head which is capable of covering a view of approximately ±30 degrees from the horizon and 360 degrees all round.

A further object of the invention is to provide a sensor of the aforementioned type which maintains good wavefront qualities of the transformed beam.

Still a further object of the invention is to provide a sensor of the aforementioned type which transforms a wide panoramic view into a narrower forward looking view that a single sensor can accept.

SUMMARY OF THE INVENTION

The invention resides in a device for creating a panoramic field of view comprises a first light passing incident surface which is a section of cone or cylinder surface and a second incident surface which is a mirror surface onto which light passing through the first surface impinges. A third incident surface onto which light from the second incident surface impinges is provided and the third incident surface being in one embodiment an aspherical transmission surface. A recollimating element for presenting a pupil plane depiction of a panoramic field of view is also provided. Various embodiments may include single or double lens devices with a second lens provided for the purpose of recollimating light.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
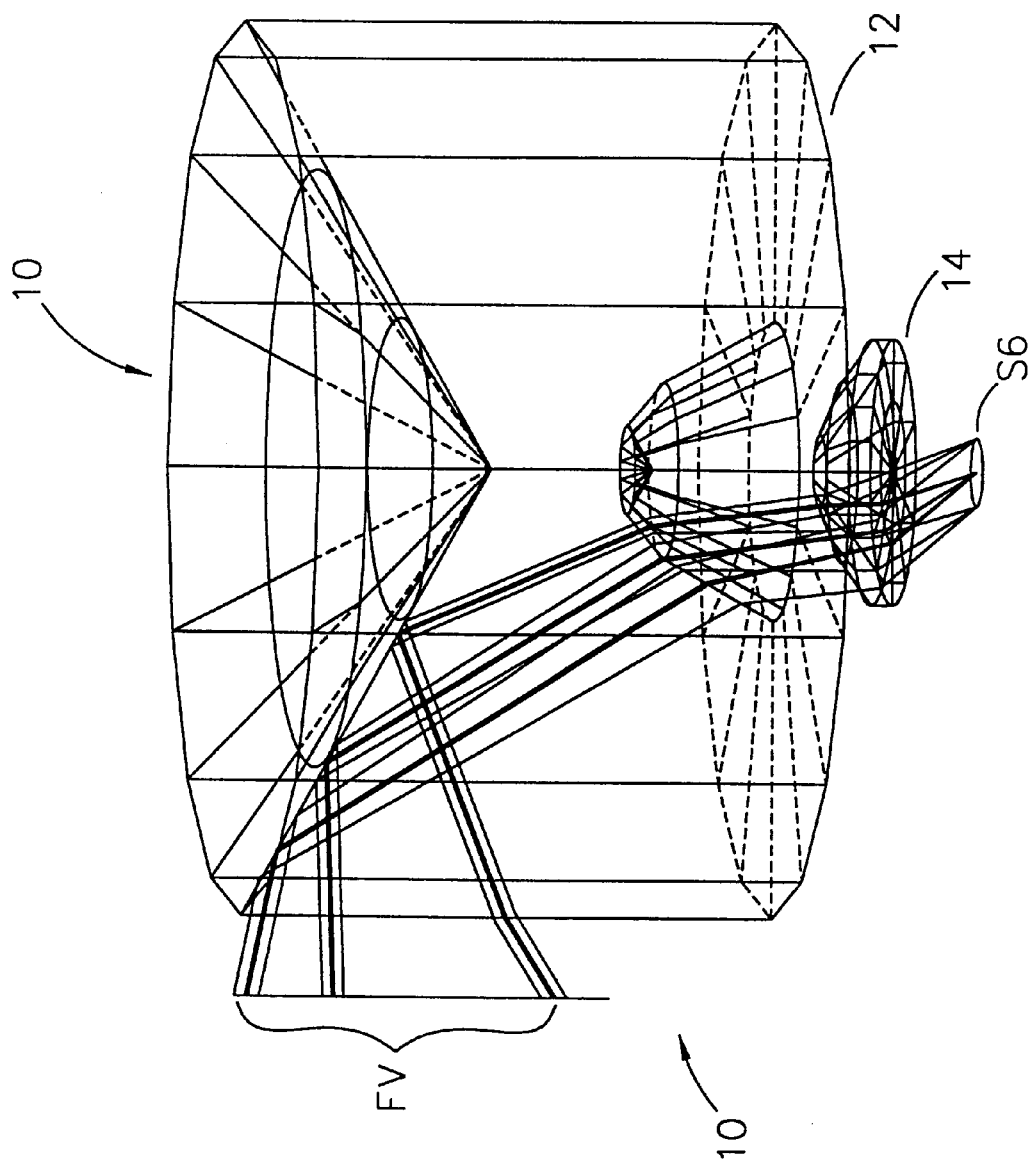
FIG. 1 is a three dimensional wire frame drawing of the device of the invention.

Referring to FIG. 1, there is shown an exploded three dimensional wire frame drawing of a device 10 incorporating features of the present invention. Although the present invention will be described with reference to the embodiments shown in the drawings, it should be understood that the present invention can be embodied in many alternate forms of embodiments. Embodiments having designations 10' and 10" shall be deemed to be alternative embodiments of that shown in FIGS. 1 and 2. In addition, any suitable size, shape or type of elements or materials could be used.

Figure 2:
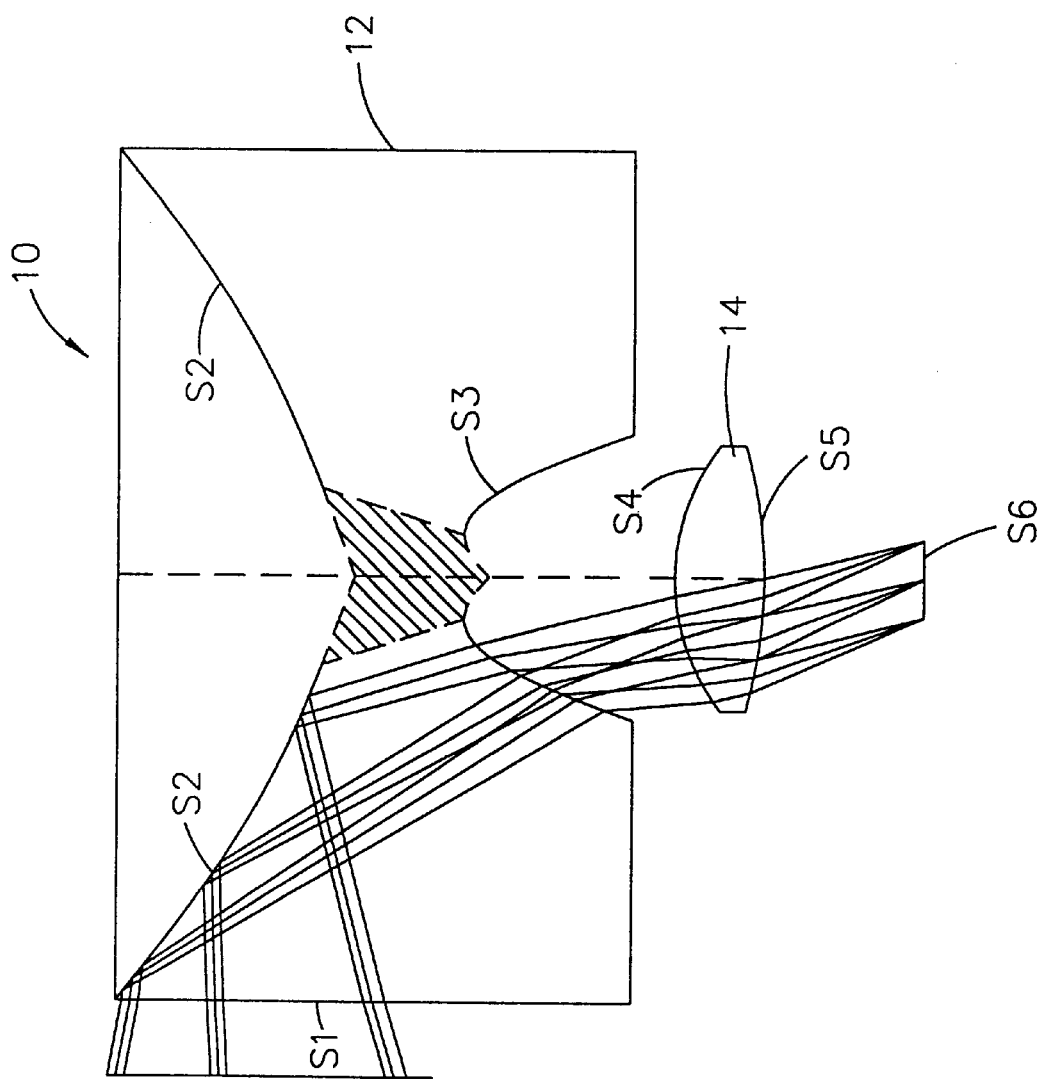
FIG. 2 is a cross section drawing of the device of FIG. 1.

Referring now to FIGS. 1 and 2, it should be seen that device 10 consists of two lenses 12 and 14 each made of glass or plastic material. Lens 12 is a compound negative element and has three optical active surfaces. These surfaces are shown as elements $S_1$, $S_2$, and $S_3$. In the embodiment shown in FIG. 2, surface $S_1$ is a cylinder surface, surface $S_2$ is a nonlinear cone mirror surface and surface $S_3$ is an aspherical transmission surface. Lens 14 is a conventional positive lens and is defined by surfaces $S_4$ and $S_5$ which functions to recollimate light onto surface $S_6$. The mirror surface $S_2$ may be made forming a coating on the corresponding exposed outer surface of the device 10. Together, lenses 12 and 14 form a reverse Galilean telescope (an a focal system with a negative front element and positive back element).

The $S_3$ surface provides the majority of the negative power and the $S_2$ surface provides some negative power, but primarily transforms the forward looking view FV to the panoramic field of view. It should be appreciated that the combined effect of surfaces $S_2$ and $S_3$ is to create negative power and to transform field of views.

A panoramic field view is ultimately presented at surface $S_6$. For pupil plane detection, a sensor is located at surface designation $S_6$. For imaging detection if so desired, the $S_6$ surface designation will be the entrance pupil of the imaging optics device, such as a CCD camera.

Figure 3:
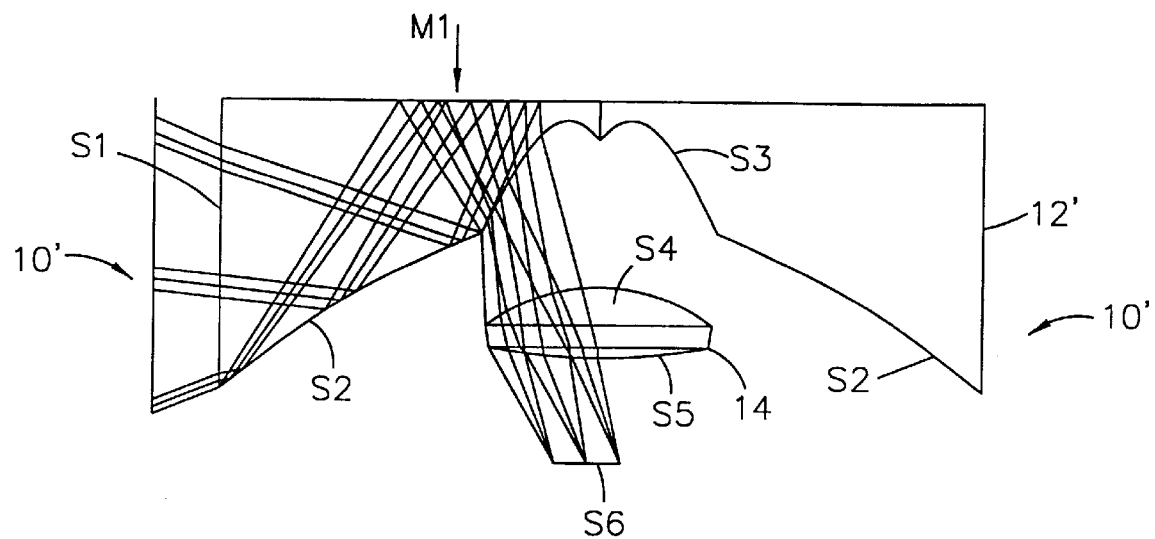
FIG. 3 is a second embodiment of the invention shown in cross section.

Referring now to FIG. 3 and to a variation of the invention shown as 10'. In this variation of the invention, the first lens 12' is provided with a reduced vertical profile. In this embodiment, a second reflective surface is provided at a general flat top surface $M_1$ of lens 12. In addition, the surface $S_2$ instead of being disposed on the top side of the device, is located in the lower side on the same side as surface $S_3$ of lens 12'. Both surfaces $M_1$ and $S_2$ are mirror surfaces coated with reflective coating. All other surfaces $S_n$'s are same as those surfaces with same markings in FIG. 2. The design of the lens 12' of FIG. 3 effectively cuts the volume of lens 12' by almost a factor of two while still having the same function as the original invention other than presenting the exit view flipped upside down.

Figure 4:
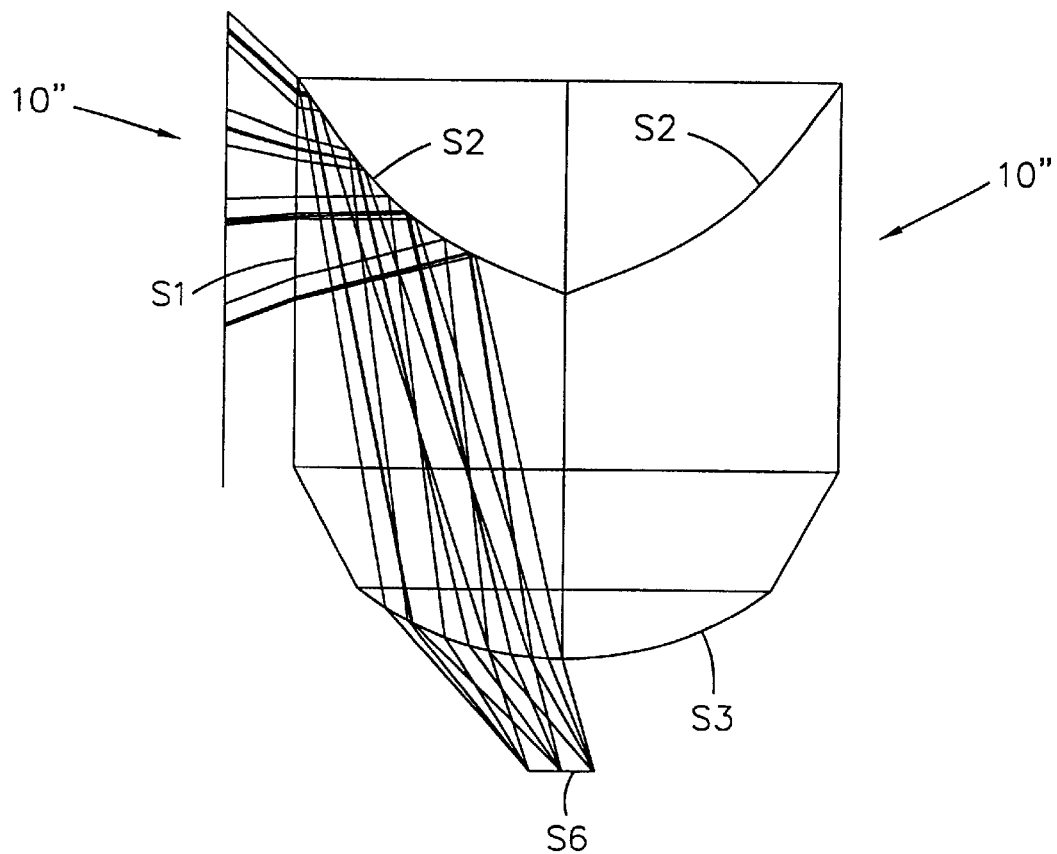
FIG. 4 is a third embodiment of the invention shown in cross section.

FIG. 4 is yet another variation of the invention and is referenced as 10". The embodiment of FIG. 4 is a highly simplified design, but does result in reduced beam quality. It is a single element design instead of requiring the two lens design of FIGS. 1–3 above. The original function of surfaces $S_2$ and $S_3$ in FIG. 2 are now combined into a single surface $S_2$ and the recollimating function of the positive lens 14 is now provided by the surface $S_3$. This design has less beam quality but does provide a larger panoramic field of view +45° up, −30° down and 360° all around.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A device for creating a panoramic field of view comprising:

a first light passing incident surface which is a cylinder surface, a second incident surface located oppositely of said first incident surface and which second incident surface being a mirror surface onto which light passing through said first surface impinges; and a third incident surface onto which light from said second incident surface impinges, said third incident surface being an aspherical transmission surface;

a recollimating element for presenting a pupil plane depiction of a panoramic field of view; and wherein said first incident surface causes light to impinge on said oppositely disposed second incident surface in substantially the same direction as the direction of the light impinging on said first incident surface.

2. A device as defined in claim 1 further characterized by said second surface being a nonlinear cone surface.

3. A device as defined in claim 1 further characterized by said second surface being a surface which is coated with a reflective material.

4. A device as defined in claim 1 further characterized by a another reflective incident surface located in said device so as to reflect light impinging off said second incident surface onto said third incident surface.

5. A device as defined in claim 4 further characterized by said another reflective surface being a surface which is coated with a reflective material and is disposed at a top end of the device and said second incident surface being located at a bottom region of said device.

6. A device as defined in claim 1 further characterized by said first, second and third incident surfaces being part of a first lens and said light recollimating element being part of a second lens.

7. A device as defined in claim 5 further characterized by said first, second third incident surfaces and said another reflective surface being part of a first lens and said light recollimating element being part of a second lens.

8. A device as defined in claim 1 further characterized by said first, second third incident surfaces and said light recollimating element being part of a single lens.

9. A device as defined in claim 8 further characterized by said second incident surface being a mirror surface onto which light passing through said first surface impinges and being an aspherical transmission surface; and wherein said third light incident surface being part of said recollimating element.

10. A device as defined in claim 9 further characterized by said second incident surface being a nonlinear cone surface.

11. A device for creating a panoramic field of view comprising:

a first light passing incident surface which is a cylinder surface, a second incident surface which is a mirror surface onto which light passing through said first surface impinges; and a third incident surface onto which light from said second incident surface impinges, said third incident surface being an aspherical transmission surface;

a recollimating element for presenting a pupil plane depiction of a panoramic field of view; and said first, second third incident surfaces and said light recollimating element being part of a single lens.

\* \* \* \* \*